UNITED STATES PATENT OFFICE.

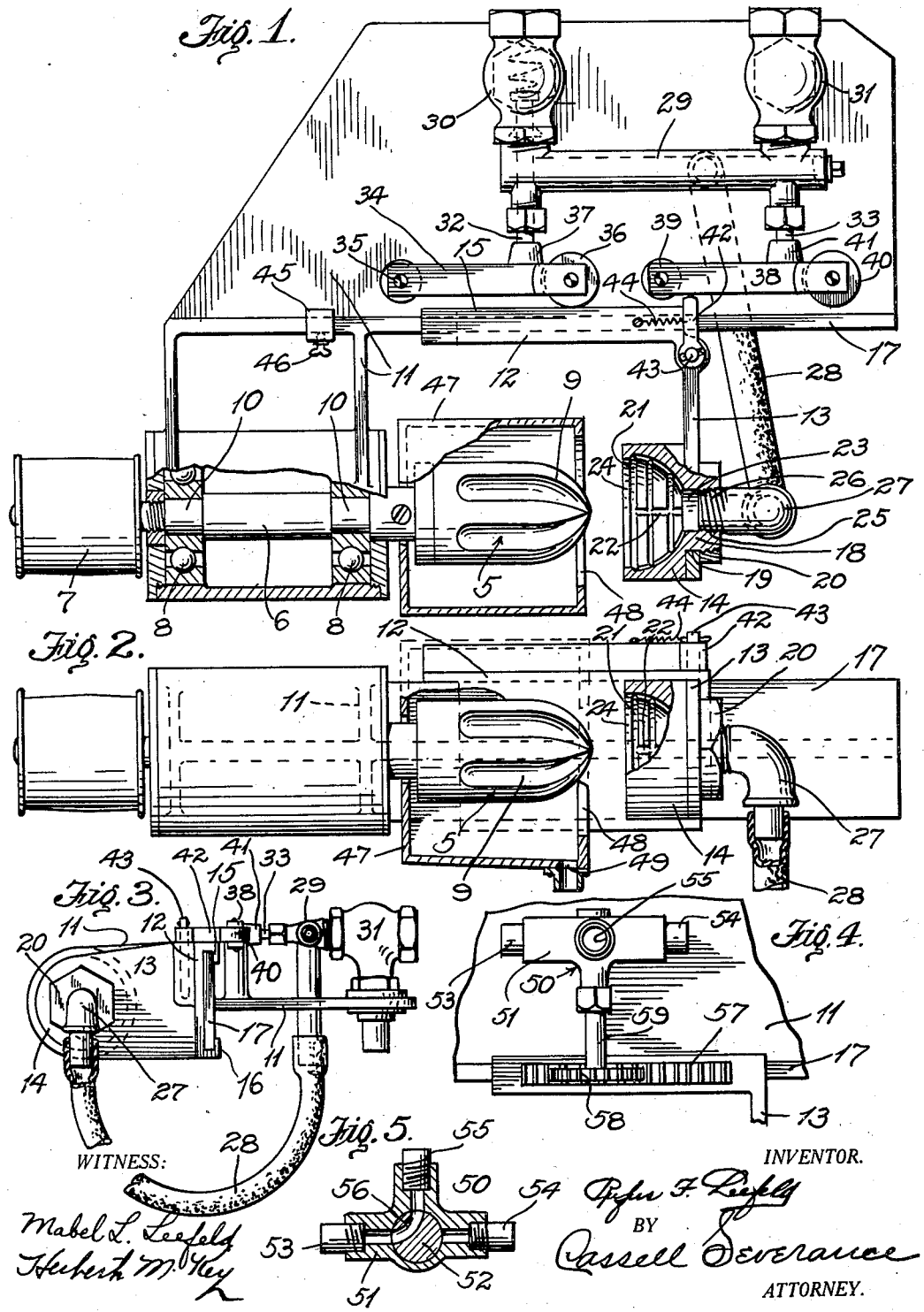

RUFUS F. LEEFELD, OF CORONA, CALIFORNIA, ASSIGNOR TO EXCHANGE BY-PRODUCTS COMPANY, OF CORONA, CALIFORNIA, A CORPORATION OF CALIFORNIA.

FRUIT-PULP EXTRACTOR.

1,304,892.	Specification of Letters Patent.	Patented May 27, 1919.

Application filed May 7, 1917. Serial No. 166,780.

*To all whom it may concern:*

Be it known that I, RUFUS F. LEEFELD, a citizen of the United States, residing at Corona, in the county of Riverside and State of California, have invented certain new and useful Improvements in Fruit-Pulp Extractors, of which the following is a specification.

This invention relates to improvements in fruit pulp extractors, being adapted for use in taking out the pulp and juice from the interior of certain kinds of fruit, and particularly of the different kinds of citrus fruits, in which the pulp can be easily removed from the outer skin.

It is an object of the invention to provide a mechanism having a rotary pulp extractor or cutter and a holding device for the fruit, by which the fruit may be forced against the extracting head until the contents of the skin are removed.

It is a further object of the invention to provide a fruit holding means in which the fruit is held under the suction of a vacuum, whereby the fruit will be held in a proper shape to fit upon the extracting head or cutter, the skin of the fruit thus always assuming the shape of the cup.

It is a further object of the invention to provide a mechanism of the character mentioned, in which the fruit will be held by a vacuum suction to be presented to the extracting head or cutter, and after the contents of the skin have been removed, the skin is ejected from the cup by the application of compressed air.

It is a still further object of the invention to provide automatic means operable in accordance with the position of the fruit holder to apply a suction for holding the fruit and its skin in place, and then to apply compressed air for forcing the skin out of said holder, after the pulp and juice have been removed therefrom.

With these and other objects in view, the invention comprises certain novel constructions, combinations, and arrangements of parts, as will be hereinafter more fully described and claimed.

In the accompanying drawing forming a part of this specification:

Figure 1 is a top plan view of a fruit pulp extracting machine constructed in accordance with this invention, parts thereof being broken away and shown in section.

Fig. 2 is a side elevation of the said mechanism, a part of the fruit holder being broken away, and the hood which incloses the cutter or extractor being shown in section.

Fig. 3 is an end elevation of the device, looking at the same at the end of the machine, which is provided with the fruit holder.

Fig. 4 is a detail fragmentary plan view of a modified form of valve mechanism which may be used, and showing the means for actuating the same.

Fig. 5 is a detail sectional view through the valve in said modified form of mechanism.

The mechanism of the present invention is especially intended for the obtaining of the pulp, juice, and contents of certain kinds of fruit, and especially of citrus fruit, where the pulpy and juicy interior thereof can be easily removed by cutting the fruit in half and applying each half against a rotating member or cutter, or a similar device capable of reaming or cutting the pulp and fruit contents within the skin. Rotating cutting devices or heads have been used heretofore, but the holding means for presenting the fruit to said cutting head or reamer constitutes the most important feature of the invention, the said device being so constructed that the fruit may be retained therein by suction, and may be ejected therefrom by air pressure.

In the accompanying illustration, preferred means for accomplishing the desired result have been shown, and the details and features of the invention will now be more specifically described, reference being had thereto. In the said drawing, 5 indicates a rotating pulp removing head or reaming cutter, 6 a shaft carrying the same, 7 a pulley adapted to receive power from any desired source for rotating the said shaft and head, and 8 anti-friction bearings, usually of the ball type for facilitating the rapid movement in the rotating shaft 6.

The cutter or pulp removing head 5, may be of any desired construction, and is made with a rounded pointed end portion, adapted to fit closely within the skin, mounted in the holding mechanism of the device. The head 5 is shaped to form cutting edges 9, adapted to remove the contents of the fruit skin, usually when the head is rotated within the said skin. The head is fastened to the end of the shaft 6, and the shaft is formed with journaled bearings 10, adapted to engage the ball bearings 8, whereby the shaft may turn very rapidly without undue friction. The pulley 7 is mounted upon the end of the shaft 6 opposite to that carrying the said cutter head 5. The shaft 6 and the cutter head 5 and pulley 7, are preferably mounted upon any suitable framing or supporting bed 11, a portion of said frame carrying the said bearings 8. Movably mounted upon the said frame 11, is a sliding member 12, having an arm 13 projecting therefrom, and a fruit carrying member 14 is mounted upon the said arm 13. The sliding member 12 is preferably made with overhanging flanges 15 and 16, adapted to inclose oppositely extending flanges 17 formed upon the frame or bed 11, the said flanges 17 forming a T head, upon which the sliding member may move back and forth.

The fruit holder comprises a cup shape feed carrying member, having an approximately semi-spherical recess in one face thereof, the said recess being of sufficient diameter to receive and fit over the pointed end of the cutting head 5. The cupped shape fruit holder 14 may be provided with a shank 18, adapted to be inserted in an aperture 19 formed in the outer end of the arm 13. The end of said shank is threaded and adapted to be engaged by a nut 20, for firmly fastening it to the said arm 13. The fruit receiving recess is formed with a series of circular grooves 21, arranged parallel with each other, and extending around the inner surface of the said recess. At intervals, cross grooves 22 are provided, which intersect the circular grooves and connect them with a central opening 23 formed in the shank 18. The cross grooves 22 do not extend entirely to the edge of the fruit holder, so that a continuous smooth inner surface 24 is provided within the said fruit holder and entirely around the edge thereof, whereby a smooth and continuous surface engages the skin of the fruit around the edges of said cup, making more effective the action of the suction in drawing the skin into the cup and holding it in place. The interior of the opening 23 in the shank is threaded at 25, and adapted to be screwed upon the end of a pipe connection at 26. The said pipe connection is provided with an elbow 27 connecting with a flexible piping 28, which leads to the source of the suction employed, and of the compressed air used alternately therewith. The piping 28, usually a rubber hose, is connected with a cross head 29, one end of which extends to a valve 30 for controlling the application of a suction to the fruit holder, while the other end connects with a valve 31, which controls the application of air under pressure to the said fruit holder. The valves 30 and 31 may be made in any desired manner and as indicated in dotted lines, are preferably spring controlled, so as to tend to be seated when not in use. The valve 30 is provided with a valve stem 32, while the valve 31 has a valve stem 33, and the parts are so arranged that pressure upon either of these valve stems will operate their respective valves, and establish a connection between the fruit holder with the suction line, or the compressed air line as required. The valve stems 32 and 33 are preferably automatically operated when the sliding member 12, which carries the fruit holder, is in certain positions. In order to operate the valve 30 and the stem 32, an arm 34 is pivoted at 35 to the bed of the machine, and the said arm carries at its free end an anti-friction roller 36, which is adapted to be engaged by the sliding member 12, during a part of its movement. A boss 37 projects from the arm 34 in alinement with the valve stem 32, so that when the roller 36 is pushed toward the valve 30 by the said sliding member 12, the arm 34 will be moved to push the boss 37 against the valve stem 32 and thus open the valve 30, whereby the suction produced by the vacuum means controlled thereby, will be effective at the fruit holder for forcing the skin of the fruit tightly against the inner walls in said holder. It being necessary to apply the suction to the fruit holder for the greater part of its movement, the sliding member 12, is made of sufficient length to engage the said roller 36 and keep the vacuum valve 30 open as long as required. When the fruit holder is pulled away from the pulp removing head a suitable distance, the roller 36 will be released from its engagement with said sliding member 12, and will permit the spring in the valve 30 to close the valve.

The compressed air valve 31 is also operated by an arm 38, similar to the arm 34, and pivoted at 39 to the bed of the machine, the said arm having an anti-friction roller 40 at its free end. A boss 41 upon said arm is adapted to be forced against the valve stem 33 for admitting the compressed air to the fruit holder when the skins are to be ejected. The said roller 40 is adapted to be struck by a short pivoted arm 42, mounted upon a stud 43 arranged upon the arm 13 opposite the end of the member 12. The arm 42 projects far enough beyond the sliding member 12 to strike the roller member 40, and push it toward the valve 31, whereby the air under pressure will be permitted to escape from said valve 31 into the fruit holder for blowing the fruit skins out of the same. It will be observed that the distance between the rollers 36 and 40, is such that the two valves 30 and 31 will not be opened simultaneously, for when the lever 42 engages the roller 40, the sliding member 12 will have passed the roller 36 and permit it to release the spring actuated valve 30. When the sliding member 12 is moved toward the roller 36 again, the lever 42 will swing upon its pivot stud 43, so as to pass the roller 40 without actuating it. A light spring 44 will normally keep the lever 42, against the end of the sliding member 12, so as to make it effective for moving the roller 40.

The movement of the fruit holder 14 toward the head 5, may be limited by an adjustable stop 45, adapted to be clamped by a set screw 46 at any desired point upon one of the flanges 17, which carries the sliding member 12. By means of this stop, the distance to which the cup shaped fruit holder 14 can be pushed over the cutter head may be regulated in accordance with the thickness of the skin of the fruit, so that the contents of the fruit can be removed as close to the skin as desired. The device may thus be set for operation upon thin skinned fruit or thick skinned fruit, as desired.

In order to collect all of the pulp and juice which is extracted from the skins of the fruit, a hood 47 is mounted upon the machine, so as to almost entirely surround the rotating head 5. The said hood is made of ample size to receive the fruit holder 14, and is provided with an opening 48, opposite the cutting end of the head 5, to permit the entrance of the fruit holder, as it is moved toward the said head 5. The said hood 47 being closed except upon the side adjacent to the fruit holder, will collect the contents of the fruit, and the said hood is provided with an outlet drain opening 49, adapted to lead the juices and pulp of the fruit to any desired point. The pulp extracting head 5 may be driven at any desired speed within such a hood, without the danger of losing the juices or other contents of the fruit.

It will be readily understood that any desired valve mechanism may be used to control the application of the suction, or the compression employed in holding the skins of the fruit or ejecting the same. As shown in Fig. 4, a 3-way valve mechanism 50 may be used if desired. The said valve mechanism is provided with a valve casing 51, having a valve plug 52, adapted to rotate therein. One end of the said casing is connected by piping 53, with the vacuum mechanism or suction means, while the opposite end of the said casing is connected by a piping 54 with a compressed air supply. An outlet port in said valve casing, also communicates with the fruit holding cup member by piping 55. The valve plug 52 is preferably provided with a curved port 56, arranged so that when the valve is turned in one direction, the pipes 53 and 55 will be connected in applying the suction to the fruit holder, and when it is turned in the other direction, the pipes 54 and 55 will be connected for delivering a charge of compressed air to the said fruit holder. The valve is adapted to be operated in connection with the movement of the sliding member, which carries the fruit holder by means of a toothed rack 57 carried by said sliding member, and engaging and meshing with the the teeth of a spur gear 58, which is fastened upon the outer end of the valve stem 59 of said valve 52. By properly timing and arranging the teeth of this gearing, the valve 52 may be rotated at the proper time for connecting the suction with the fruit holder, and then again at the proper time for connecting the fruit holder with the compressed air means for ejecting the skins.

In the operation of the device, the fruit to be handled is first cut approximately in half. The fruit holder being then retracted from the rotating head 5, a half portion of the fruit is placed therein, and the slide member 12 is moved far enough to engage the roller 36 and open the suction valve 30. The suction thus applied to the fruit holder will draw the skin of the fruit tight against the walls of the said holder, the grooves 21 and 22 insuring a thorough distribution of the suctional pull upon all parts of the fruit skin. It will be understood that the unevenness in different pieces of fruit and the various shapes of the several pieces of fruit, will thus make no difference in the handling thereof, for all the various shapes will be brought uniformly to the shape of the interior of said fruit holder. The skin of the fruit will thus be adapted to fit properly over the end of the rotating head 5, and the contents of the fruit can be thoroughly and completely reamed or cut therefrom, as the holder is pushed against the said head. By adjusting the stop 45, and moving the holder until the sliding member 12 engages the same, the two parts may be brought together so as to remove the contents of the skin, but not cut into the same. In this simple manner, an even thickness of the finished peel can be assured. During the time when the fruit is being pressed upon the rotating head 5 and until the holder is retracted again to a considerable distance, the sliding member 12 will keep the suction applying valve open. After the reaming operation, the holder is pulled away from the head 5 until the arm or lever 42 engages the roller 40 for turning the compressed air into the holder through the valve 31. At this time, the sliding member 12 will have released the roller 36 for closing the suction valve and compressed air will be directed into the holder behind the empty skin and will eject the same. It will be observed that the holder 14 and the sliding member 12 may be operated by hand, or that any desired automatic means may also be provided for its movement if desired.

It will be observed that a machine of this kind can be used for the extracting of pulp, juice, etc., from oranges, lemons, grape-fruit, limes, or the like, the device being especially useful in connection with the different kinds of citrus fruits. The application of the vacuum pressure to the skins, not only causes a uniform holding of the skins to the shape of the cup, but also operates to hold the skins against turning in the said cup when the fruit is pressed against the rotating head 5.

What is claimed is:

1. A mechanism for removing the contents of fruit from their skins comprising a rotating member, a cupped holder adapted to be intermittently moved into operative engagement therewith, means for applying a suction to said holder for holding the fruit therein, and means for applying compressed air to the said holder afterward for ejecting the skins of the fruit.

2. A mechanism for removing the contents of fruit comprising a rotating cutter head, a non-rotatable fruit holding cup member in operative engagement therewith, means for applying a suctional force in said cup for holding the fruit therein, and giving the skins thereof a uniform size, and means for applying compressed air to said cup member for ejecting the empty skin, and means for automatically regulating the supply of suction and compression as said holder is moved relative to said head.

3. A mechanism for removing the interior product of fruit from their skins comprising a rotating cutter head, means for rotating the same, a non-rotatable and reciprocating fruit holder having a cup portion adapted to fit over the end of the rotating cutter, means for holding fruit in said cup member under the action of a vacuum while the fruit is being presented to the rotating cutter, and means for applying compressed air to the interior of said cup, when desired to eject the empty skin of the fruit, and automatic means for regulating the vacuum and air supply to said holder.

4. A mechanism for removing the contents of fruit from their skins comprising a rotating cutter, a relatively reciprocable head holding member having a cup like recess and having passageways formed in the inner face thereof, means for producing a suction under a vacuum within the said cup member, and the passageways formed on the inner face thereof, whereby the skin of the fruit will be drawn tightly against the inner face of the cup like recess, whereby a uniform shape will be imparted to the fruit and its skin when presented to the rotating cutter, and automatic means for regulating the supply of vacuum and air as said holder is reciprocated.

5. A machine for removing the contents of citrus fruits from its skin, comprising a rotating pulp cutter, a movable fruit holder adapted to be advanced and withdrawn from the said cutter, said holder having a fruit receiving recess adapted to fit over the cutter, said recess being connected by suitable piping with a suction producing source, a valve for controlling the application of said vacuum suction, means also connecting the holder with a source of compression, and a valve controlling the said connection, whereby compression may be employed in the holder when the said valve is operated for ejecting the skins of the fruit.

6. A machine for removing the contents of fruit from its skin, comprising a rotating cutter head, a fruit holder having a suction recess therein, piping for connecting said recess with a vacuum suction supply, means also connecting said holder with a compression supply, valves controlling the suction supply and the compression supply, and means operated by the movement of the fruit holder to and from the cutter head, whereby the said holder will be connected either with the vacuum suction supply or the compression supply.

7. An apparatus for removing fruit pulp and juice from their skins, comprising a reaming device, a fruit holding device having a cup member, a slide carrying said cup member, piping connecting the fruit holder with a suction supply line, and a compressed air supply line, valves controlling each of said supply lines, tripping devices adapted to open the said valves when desired, the said tripping devices being adapted to be operated by the said slide member when the suction is to be applied and when the compressed air is to be applied in holding or ejecting the fruit and its skin in and from the said holder.

8. A mechanism for removing the inner contents of fruit from the skin comprising a rotating reaming device, a hood inclosing said reaming device for collecting the materials reamed, a cup member adapted to receive divided fruit and having suction distributing grooves upon the inner face thereof, piping connecting said cup member with a suction supply and a compressed air supply, and means for automatically applying either supply to the cup member according to the position thereof, with respect to the reaming device.

9. A mechanism for removing the interior contents of fruit from the skin, comprising a rotary cutter, a shaft carrying the same, ball bearings carrying said shaft, a pulley for driving the said shaft, a reciprocating carriage mounted upon the machine and having a cup member mounted thereon, adapted to receive sections of fruit to be acted on, a valve mechanism for controlling the application of suction, or compressed air to the said cup, and means engaging the said reciprocating carriage for operating the said valve mechanism in accordance with the position of the cup with respect to the cutter, and an adjustable stop for limiting the movement of the carriage, whereby the thickness of the finishel peel may be controlled.

In testimony whereof, I have hereunto set my hand, in presence of two witnesses.

RUFUS F. LEEFELD.

Witnesses:
MABEL L. LEEFELD,
HERBERT M. KEY.